(12) United States Patent
Draemel et al.

(10) Patent No.: US 7,594,993 B2
(45) Date of Patent: Sep. 29, 2009

(54) FCC FEED INJECTION ZONE

(75) Inventors: Dean C. Draemel, Alameda, CA (US);
Todd R. Steffens, Centreville, VA (US)

(73) Assignee: Exxonmobile Research and Engineering Company, Annandale, NJ (US)

( * ) Notice: Subject to any disclaimer, the term of this patent is extended or adjusted under 35 U.S.C. 154(b) by 282 days.

(21) Appl. No.: 10/574,796

(22) PCT Filed: Oct. 29, 2004

(86) PCT No.: PCT/US2004/036109

§ 371 (c)(1),
(2), (4) Date: Nov. 6, 2006

(87) PCT Pub. No.: WO2005/047428

PCT Pub. Date: May 26, 2005

(65) Prior Publication Data

US 2007/0051665 A1    Mar. 8, 2007

Related U.S. Application Data

(60) Provisional application No. 60/517,474, filed on Nov. 5, 2003.

(51) Int. Cl.
*C10G 11/18*    (2006.01)
(52) U.S. Cl. ............... 208/113; 208/153; 208/157; 422/140; 422/213
(58) Field of Classification Search ............ 208/106, 208/113, 153, 157, 163, 176; 422/140, 213
See application file for complete search history.

(56) References Cited

U.S. PATENT DOCUMENTS

| | | | |
|---|---|---|---|
| 3,136,705 A | 6/1964 | Sommers | |
| 4,820,494 A * | 4/1989 | Gartside et al. | ............. 422/145 |
| 5,108,583 A | 4/1992 | Keon | |
| 5,139,748 A | 8/1992 | Lomas et al. | |
| 5,358,632 A | 10/1994 | Hedrick | |
| 5,368,824 A | 11/1994 | Nell et al. | |
| 6,042,717 A | 3/2000 | Radcliffe et al. | |
| 6,199,768 B1 | 3/2001 | Koveal et al. | |
| 6,503,461 B1 | 1/2003 | Burgard et al. | |
| 6,613,290 B1 | 9/2003 | Senior | |

* cited by examiner

*Primary Examiner*—Walter D Griffin
*Assistant Examiner*—Renee Robinson
(74) *Attorney, Agent, or Firm*—Bruce M. Bordelon; Gerard J. Hughes

(57) ABSTRACT

This invention relates to the feed injection zone of a FCC. The feed injection zone is non-circular in shape allows for optimal penetration between feed and catalyst in the feed injection zone.

9 Claims, 4 Drawing Sheets

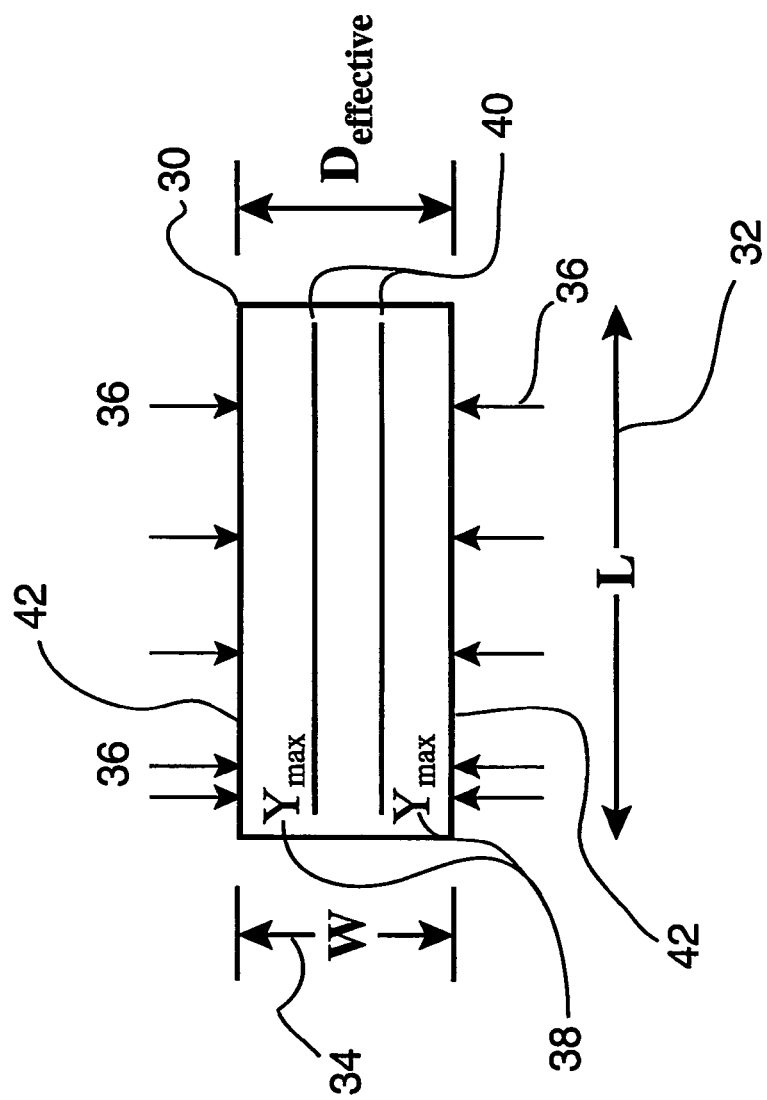

FCC FEED INJECTION ZONE

FIELD ON THE INVENTION

This invention relates to the feed injection zone of a fluid catalytic cracker. More particularly, the geometry of the feed injection zone is modified such that the feed injection zone is non-circular in order to provide optimal mixing of feed and catalyst.

BACKGROUND OF THE INVENTION

In the fluid catalytic cracking process for converting high boiling hydrocarbons to lighter hydrocarbons, catalyst particles in a fluidized state are contacted with hydrocarbon in at least one contacting zone. The manner of contacting of hydrocarbon and catalyst can have a marked influence on the performance of a fluid catalytic cracker ("FCC"). It would be advantageous if catalyst particles in the riser of a FCC could be completely and instantaneously mixed with hydrocarbon in a feed mixing zone. However, this is not physically possible. There have been many efforts to optimize mixing of hydrocarbon and catalyst in order to improve the performance of the FCC.

Efforts to improve mixing in the feed mixing zone have focused on the injection nozzles used to inject feed and on the manner in which catalyst and feed are mixed. One purpose of the injection nozzle is to make as fine a dispersal of feed as possible. The process of making fine droplets is known as fluid atomization and is influenced by factors such as orifice size, pressure drop and fluid density and viscosity.

One manner of influencing the mixing feed and catalyst focuses on feed preparation. For example the feed may be mixed with a gas stream prior to atomization. The feed may be discharged through an orifice into a mixing tube prior to contacting catalyst. The feed, the catalyst or both may also be accelerated prior to mixing. A lift gas may be used to accelerate catalyst particles in the riser.

The orientation of feed injectors may also affect feed mixing. In one case, the feed is radially directed through nozzles arrayed around the circumference of the riser. Other arrangements of nozzles and methods of injecting focus on the creation of a venturi effect. This is accomplished by creating a restriction in the flow path of the catalyst, feed or both. Another method and apparatus involves a feed injection arrangement in which feed is injected transversely from the sides of a restricted opening involving different cross-sections in the mixing zone.

There is an advantage to optimizing the mixing zone in a FCC unit without reliance on accelerating the catalyst as this energy input results in a pressure drop and limits catalyst circulation.

SUMMARY OF THE INVENTION

The invention is directed to a process for improving the mixing of catalyst and feed. Accordingly, the invention relates to a process for mixing fluidized particles with a fluid hydrocarbon feed stream in a feed injection zone of a fluid catalytic cracker which comprises:

(a) passing fluidized particles to a particle conduit;

(b) conducting the fluidized particles from the particle conduit to the feed injection zone containing a non-circular conduit provided that the particle conduit and the non-circular conduit have a substantially equal cross-sectional area; and (c) injecting fluid hydrocarbon feed into the feed injection zone through a plurality of feed injectors located upon said non-circular conduit.

In another embodiment, the invention relates to a process for mixing fluidized particles with a fluid hydrocarbon feed stream in a feed injection zone of a fluid catalytic cracker which comprises:

(a) passing fluidized particles to a particle conduit;

(b) conducting the fluidized particles from the particle conduit to the feed injection zone containing a rectangular conduit provided that the particle conduit and the rectangular conduit have a substantially equal cross-sectional area; and (c) injecting fluid hydrocarbon feed into the feed injection zone through a plurality of feed injectors located upon said rectangular conduit.

The use of a non-circular conduit allows jets of feed injected from the sides of the conduit to more effectively penetrate the stream of catalyst particles.

BRIEF DESCRIPTION OF THE DRAWINGS

FIG. 4 shows the plan view cross-section of a non-circular FCC feed injection zone and demonstrates the advantage of using a non-circular duct for the catalyst.

DETAILED DESCRIPTION OF THE INVENTION

Figure 1:
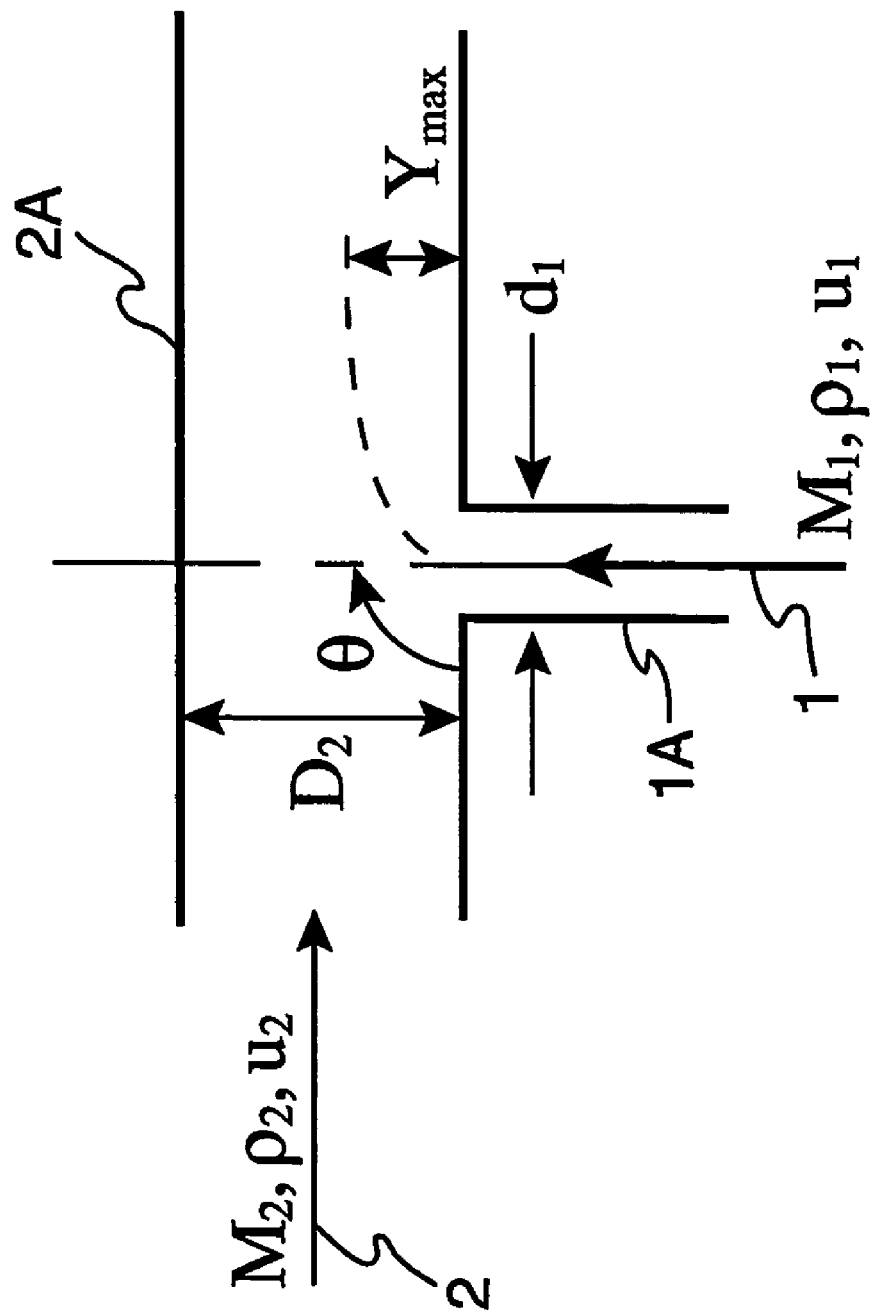
FIG. 1 is a schematic showing the jet mixing between two jets flowing at an angle $\theta=90$ degrees to each another.

The FCC process normally comprises a fluid catalytic cracking reactor and a regenerator. The FCC reactor includes a feed riser containing a feed injection zone followed by a reaction zone in which preheated fluidized catalyst particles are contacted with hydrocarbon feed. Spent catalyst particles from the reaction zone are passed through a stripping zone and stripped catalyst is sent to a regenerator. The feed injection zone typically comprises a plurality of feed injectors spaced about a circular catalyst duct while the reaction zone is typically a riser or pipeline type contactor downstream of the feed injection zone.

The feeds to the FCC reactor may be individual or mixtures of feeds including vacuum and atmospheric gas oils, light cat cracker gas oils, coker gas oils, resids from vacuum and atmospheric distillation units, whole and reduced crudes, asphalt and asphaltenes, oils derived from thermal cracking such as cycle oils, oils derived from tar sands and coal, shale oil, synthetic crudes and the like. The feeds may be pretreated to remove undesirable components, e.g., by hydrotreating or solvent treating.

FCC catalysts may be amorphous such as silica-alumina, crystalline or mixtures thereof. Crystalline catalysts are molecular sieves, preferably zeolites. Examples of zeolites include X, Y, REY, USY, beta and the like. Zeolite contents of catalysts are typically in the range from 15 to 40 wt. %, based on catalysts. The catalysts are normally finely divided with average particle sizes in the 50 to 200μ range.

Typical FCC reaction zone conditions include temperatures of from 427 to 732° C. (800 to 1350° F.), pressures of from 135 to 515 kPa (5 to 60 psig), catalyst contact times of from 0.5 to 15 seconds, and catalyst to feed weight ratios of from 0.5 to 10. The feed may be preheated to a temperature of from 177 to 454° C. (350 to 850° F.).

In the FCC reaction zone of the riser, fluidized hot catalyst particles are contacted with atomized feed. The feed is rapidly vaporized and cracked to lighter products such as gasoline, diesel, jet, kerosene, heating oil and the like. Vaporized product and spent catalyst are separated in an upper disengaging section of the reactor. The spent catalyst particles are stripped, typically with steam to recover additional product. The stripped catalyst particles are sent to a regenerator where coke is burned off. Regenerated catalyst is then recycled back to the riser.

In a typical FCC riser, the feed injection zone is circular and the fluidized catalyst flows upwardly wherein catalyst is contacted with atomized feed injected through nozzles located circumferentially around the circular feed injection zone. The diameter of the injection zone may be modified and/or the nozzle design/orientation may be modified to improve mixing of feed and catalyst. As the total design throughput (catalyst flow rate) through the FCC reactor increases, the cross-sectional area and circumference of the riser and feed zone are typically increased. As the design feed rate is increased, the number and/or size of injection nozzles is increased. The feed injectors are typically highly optimized for feed atomization, and the range of flow rates and discharge conditions for any given nozzle are restricted by these design consideration. In many cases, the jet mixing between the feed jets and the catalyst stream is not or cannot be optimized because the characteristics of the feed jets cannot be changed to allow for optimum penetration and mixing with the characteristics of the catalyst stream and riser dimensions.

Mixing theory may be used to predict fluid behavior when mixing fluids flowing through different diameter circular ducts. FIG. 1 shows a simplified drawing of jet mixing between two jets flowing at an angle θ=90 degrees to each other through ducts of diameters $D_2$ and $d1$. The jets consist of fluids having various mass flow rates, densities, and velocities. The optimum mixing of the two jets can be characterized by an equation relating the characteristic rates, densities, velocities, and duct diameters. An example is shown for the case of the relative angle between the two jets θ=90 degrees. In the situation shown in FIG. 1, where two fluids 1 and 2 flowing through two ducts 1A and 2A are contacted with each other, $M_1$ and $M_2$ are the mass rates of the respective fluids 1 and 2, $\rho_1$ and $\rho_2$ are the respective densities, $u_1$ and $u_2$ are the respective velocities, $D_2$ is the effective or equivalent diameter of the larger duct 2A and $d_1$ is the effective or equivalent diameter of the smaller duct 1A, and θ is the contact angle between the two jets of fluids 1 and 2. For jets with θ=90°, $Y_{max}/D_1 = 1.25 ((\rho_1 u_1^2/\rho_2 u_2^2)^{0.5})(M_1/(M_2+M_2))$ where $Y_{max}$ is the penetration limit of the smaller jet flowing into the larger duct. For optimum mixing of fluids 1 and 2, it has been shown that $Y_{max}=0.33 D_2$, i.e., 0.33 times the diameter of the larger duct. For the case of FCC feed injection with two phase gas atomized feed injectors, $\rho_2$, the catalyst density in the injection zone would be in the range of 10-35 lb/ft³, and $u_2$, the velocity of the catalyst entering the feed injection zone would be 2-10 ft/s. The density of the feed jet, $\rho_1$, would be in the range from 5-20 lb/ft³, and the velocity of the feed jet, $u_1$, would be in the range from 75-300 ft/s. The diameter of the catalyst duct, $D_2$, would be from 14 ft, and the diameter of the feed injector duct, $D_1$, would be 0.05-0.75 ft. The respective mass rates $M_2$ and $M_1$ would be 330-3300 lb/s for the catalyst stream and 10-50 lb/s for the individual feed injector jets. When the various values of the densities, velocities, mass rates, and feed jet diameter are substituted into the equation and solved for $Y_{max}$, this is compared to $D_2$. When $Y_{max}=0.33 D_2$, the optimum mixing was experimentally found to occur.

When $Y_{max}=0.33 D_2$, mixing between the two fluids is optimized, i.e., this is the optimum penetration limit between the two fluids flowing through the two ducts and mixed together at a 90-degree contact angle. This can be determined experimentally by measuring temperature distributions across the larger duct and downstream of the injection point when the temperatures of the two fluids differ or when one of the fluids experiences a phase change such as vaporization. For the specific case noted of single jets of fluids with a relative angle of 90 degrees, the temperatures equilibrated fastest indicating the best mixing when $Y_{max}=0.33 D_2$. If the penetration limit was greater than or less than 0.33 $D_2$, it took longer for mixing to occur and longer for the temperature to equilibrate.

The above fluid mixing concepts are applicable to the atomization of feeds from the injection zone into the catalyst flow in a FCC riser. The concepts may also be applied to cases where the angle of the feed injector jets with respect to the axis of the catalyst stream is a value other than 90 degrees. In this case, $Y_{max}$ would be a function of the angle theta (θ) between the axis of the catalyst flow and the axis of the feed injector jets, and the value of $Y_{max}$ for optimum jet mixing would be a function of this angle theta. In a conventional circular duct having multiple injection points, it may not be possible to design the system to achieve this maximum optimum penetration value. However, in a non-circular system, it is possible to design the system to achieve optimum penetration between the catalyst and feed as the two fluids based on the above mixing model.

The present process modifies the geometry of the feed injection zone to accomplish optimum mixing. More particularly, the feed injection zone comprises a non-circular zone geometry provided that the cross-sectional area of that section of the feed riser leading to the injection zone and the injection zone itself is substantially the same. In other words, the present process uses the geometry of the injection zone itself to improve mixing rather than improving the feed nozzle efficiency or relying on any venturi effect and pressure drop resulting from changing the cross-sectional area of the feed/injection zone or improving the nozzle efficiency. By non-circular geometry is meant that the injection zone may be in the form of an ellipse, square, rectangle or two parallel sides with semi-circular or ellipsoidal ends when viewed in plan. Preferred non-circular geometries include ellipse, rectangle or parallel sides with semi-circular or ellipsoidal ends. Preferred ellipses are those in which the ratio of major to minor axes is from 1.2 to 5.0.

The non-circular feed injection zone contains a plurality of injection nozzles in which to inject feed into the fluidized catalyst. Preferred nozzles are those which achieve the greatest degree of feed atomization. These nozzles may be arranged in a plane perpendicular to the direction of axial flow of catalyst in the injection zone. The direction of flow from the feed nozzle may be perpendicular (90 degrees) to the axial flow of catalyst, or at angles of from 20 to 90 degrees relative to the direction of flow.

Figure 2:
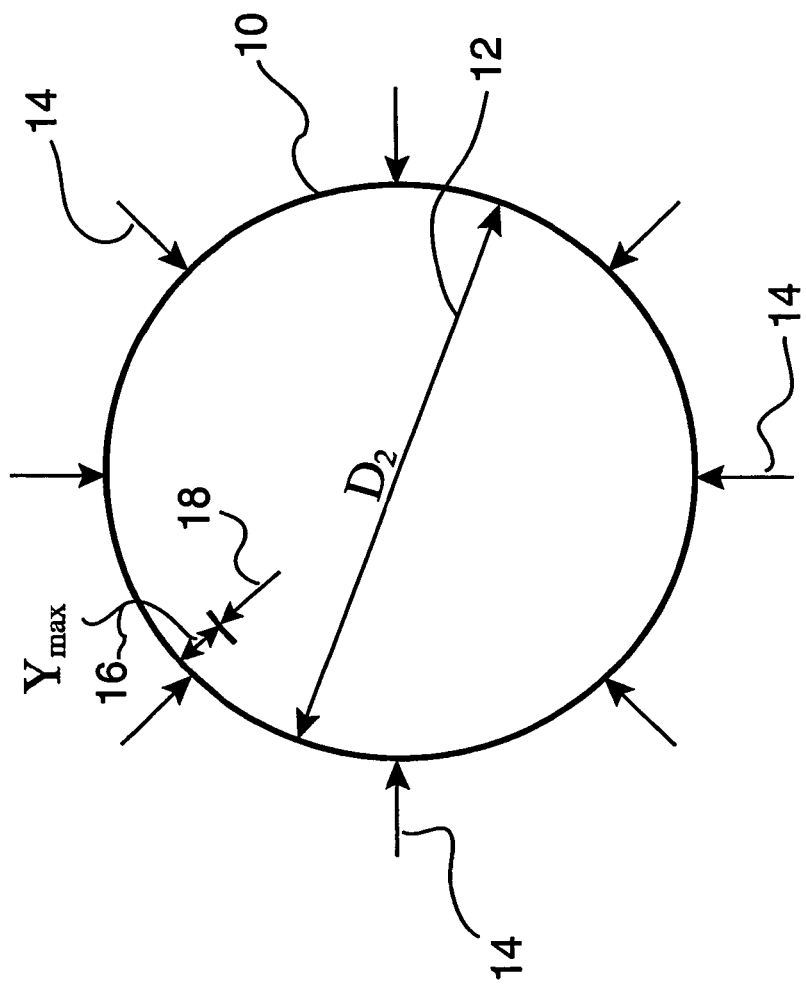
FIG. 2 shows the plan view cross-section of a typical large diameter FCC injection zone.
Figure 3:
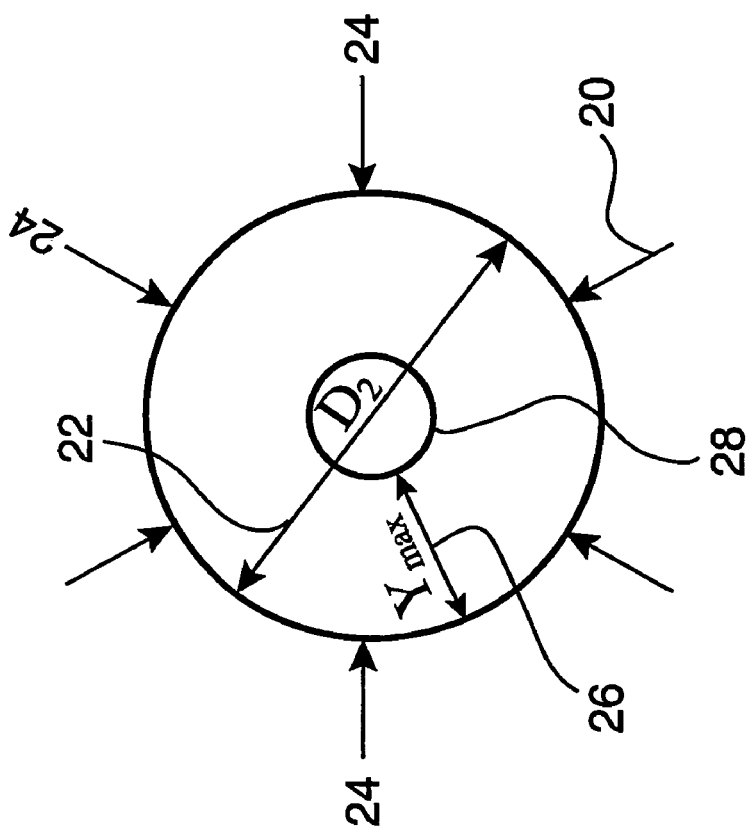
FIG. 3 shows the plan view cross-section of a typical small diameter FCC feed injection zone.

FIGS. 2 and 3 show injection zone cross-sections for typical larger and smaller circular injection zones, respectively. FIG. 2 shows the plan view cross-section of a typical large diameter FCC feed injection zone where a large duct with flowing catalyst has a series of radial feed injection nozzles. If the relationships between the mass rates, densities, velocities, and duct dimension is non-optimum, the penetration of the feed jets into the flowing catalyst stream may be insufficient to ensure optimum mixing and contacting between the two streams. FIG. 3 shows the plan view cross-section of a typical small diameter FCC feed injection zone where the large duct with flowing catalyst has a series of radial feed injection nozzles. If the relationship between the mass rates, densities, velocities, and duct dimensions is non-optimum, the penetration of the feed jets into the flowing catalyst stream may exceed that required to ensure optimum mixing and contacting between the two streams.

In FIG. 2, a cross-section of a large diameter circular FCC feed injection zone 10 with diameter $D_2$ designated as 12 contains a plurality of feed injection nozzles 14. $Y_{max}$ is the distance 16 of maximum feed penetration 18. For the case of contact angle $\Theta=90°$, if $Y_{max}$ is less than 0.33 $D_2$, under-penetration and non-optimum jet mixing will occur. In FIG. 3, a cross-section of a small diameter circular FCC feed injection 20 with diameter $D_2$ designated as 22 contains a plurality of feed injection nozzles 24. $Y_{max}$ is the distance 26 between the circular cross-section 20 and maximum feed penetration 28. For the case of contact angle $\theta=90°$, if $Y_{max}$ is greater than 0.33 $D_2$, over-penetration and non-optimum jet mixing will occur.

FIG. 4 demonstrates the advantage of an embodiment the present invention using a non-circular (rectangular) duct for the catalyst. In this case, the cross-sectional area of the duct can be maintained constant relative to the upstream circular catalyst duct so that there is very little frictional pressure drop on the catalyst stream and no energy is required to accelerate the catalyst. However, the characteristic dimension, $D_{effective}$ required for optimal mixing between the feed jets and the catalyst stream can be provided for any upstream duct diameter $D_2$ by varying the width W of the duct such that the cross-sectional area is maintained constant.

In FIG. 4, a plurality of nozzles is arranged in a plane perpendicular to the axial flow of catalyst in the rectangular shaped feed injection zone. The rectangular cross-section 30 has a length 32 and width 34, which is equivalent to $D_{effective}$. A plurality of feed injectors 36 are located along both sides of the length of the feed injection zone. $Y_{max}$ is the distance between edge 42 and the maximum feed penetration 40. In this case assuming the angle theta is 90°, $Y_{max}$ is 0.33 $D_{effective}$ which enables the rectangular injection zone to achieve optimal jet mixing. For any desired catalyst flow area which is equal to width 32×$D_{effective}$, the dimension $D_{effective}$ could be specified to optimize the jet mixing, and the duct width could be varied to provide the required area such that the flow cross-section is maintained and no significant pressure drop is caused to the flowing catalyst stream. For injection angles other than 90°, the duct length and width can be adjusted to provide this optimum penetration while maintaining the required flow cross-section.

Where the shape of the cross-section of the injection zone is not optimal, jet mixing would not be optimized and contacting between the feed and catalyst would be poorer. Poor mixing of feed and catalyst cause a deterioration of yield selectivities and loss of profitability. For example, in a circular cross-section feed injection zone, it can be shown that selectivity can be improved by improving mixing. Table 1 shows the effects of improving mixing on the coke and gas selectivity and conversion for a feed in a circular cross-section riser. The table represents a commercial unit performance comparison when changing the effective diameter of the feed injector jets, as well as changing the velocity, mass rate, and injection angle with respect to the flowing catalyst stream. The catalyst duct dimensions and catalyst stream properties in this case were not changed. As can be seen from Table 1, the $C_2$-dry gas selectivity (Second Order Selectivity=Yield/(conversion/(100−conversion))) was reduced 16%, the bottoms selectivity was reduced 14%, and the coke selectivity was reduced 6%.

TABLE 1

| Yields | Pre-Revamp | Post Feed Injector Revamp |
| --- | --- | --- |
| Conversion, wt. % | Base | +0.9 |
| $C_2$ Minus Gas Selectivity | Base | −16% |
| Main Column Bottoms Selectivity | Base | −14% |
| Coke Selectivity | Base | −6% |

This data demonstrates the importance of jet penetration and optimum mixing. Even further improvements could be obtained by modifying the geometry of the injection zone.

The invention claimed is:

1. A method for mixing fluidized particles with a fluid hydrocarbon feed stream in a feed injection zone of a fluid catalytic cracker which comprises:
   (a) passing fluidized particles to a particle conduit;
   (b) conducting the fluidized particles from the particle conduit to the feed injection zone containing a non-circular conduit provided that the particle conduit and the non-circular conduit have a substantially equal cross-sectional area; and
   (c) injecting fluid hydrocarbon feed into the feed injection zone through a plurality of feed injectors located upon said non-circular conduit.

2. The method of claim 1 wherein the non-circular conduit is ellipsoidal, rectangular, square or two parallel sides with semi-circular or ellipsoidal ends.

3. The method of claim 2 wherein the non-circular conduit is ellipsoidal.

4. The method of claim 2 wherein the non-circular conduit is rectangular.

5. The method of claim 1 wherein the feed injectors are arranged in a plane perpendicular to the direction of axial flow of the fluidized particles in the injection zone.

6. The method of claim 5 wherein the feed injectors are injector nozzles.

7. The method of claim 6 wherein the direction of flow from the injector nozzles are perpendicular (90 degrees) to the axial flow of the fluidized particles in the injection zone.

8. The method of claim 6 wherein the injector nozzles are at angles of from 20 to 90 degrees relative to the direction of axial flow of the fluidized particles in the injection zone.

9. The method of claim 4 wherein the feed injected into the feed injection zone has a penetration equal to $0.33 D_{effective}$.

* * * * *